July 8, 1969 W. E. CURRIE 3,454,923

TRANSDUCER CONTROL APPARATUS

Filed Feb. 1, 1968

INVENTOR.
WILLIAM E. CURRIE
BY Bruce C. Lutz
ATTORNEY

United States Patent Office 3,454,923
Patented July 8, 1969

3,454,923
TRANSDUCER CONTROL APPARATUS
William E. Currie, Seattle, Wash., assignor to Honeywell Inc., Minneapolis, Minn., a corporation of Delaware
Filed Feb. 1, 1968, Ser. No. 702,218
Int. Cl. H04b 13/02; G10k 11/00
U.S. Cl. 340—8                                8 Claims

ABSTRACT OF THE DISCLOSURE

A remote control mechanism for producing rotation in each of two mutually perpendicular directions utilizing a spring loaded rack for converting linear motion into rotary motion by engaging a gear mounted on the member to be rotated in the two directions.

---

The present invention relates generally to motion converting apparatus and more particularly to a tilt and train mechanism for use in an underwater head or soundome to move a transducer about two different mutually perpendicular axes.

While there is a great deal of prior art showing various ways for remotely producing rotation of an object in two mutually perpendicular directions, the present invention requires less space for the apparatus or in the alternative allows the use of a bigger object to be rotated in the same space. Some of the prior art is shown in patents by Allyn 2,829,360 and Ross 2,759,783 both assigned to the same assignee as is the present invention.

One embodiment of the present invention utilizes a shaft which is free to move axially and to rotate upon its axis and which at one end widens in a U-shaped form to enclose the ends of a transducer. Rotation of the shaft will cause rotation of the transducer in a horizontal or train direction while axial movement of the shaft will, through the interaction of a gear on the transducer and a spring loaded rack mounted for engagement therewith, produce vertical or tilt movement of the transducer. The spring loaded rack may be mounted on the previously mentioned shaft or supported by other means to be later described.

It is therefore an object of the present invention to provide improved remote control apparatus.

Other objects and advantages of this invention may be ascertained from a reading of the specification and appended claims along with the drawings wherein:

FIGURE 1 discloses a preferred embodiment of the invention incorporated in a tilt train drive mechanism for a sonar unit;

Figure 1:
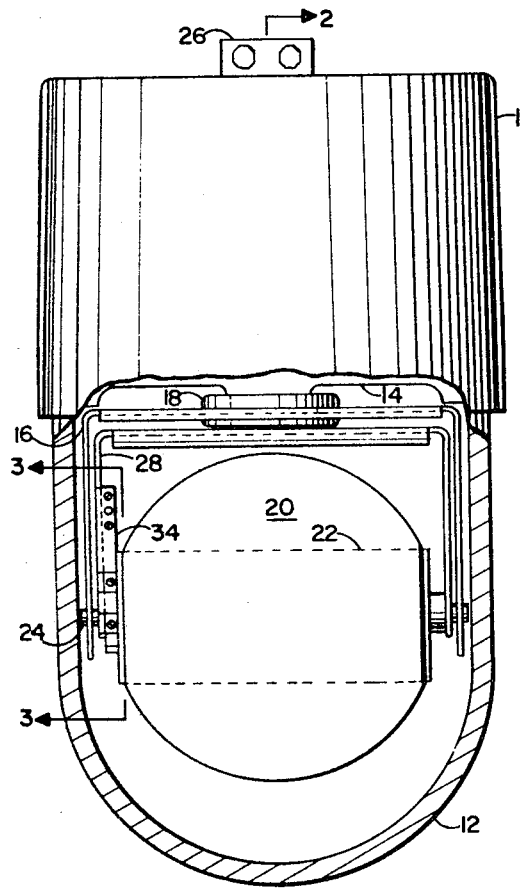
Figure 3:
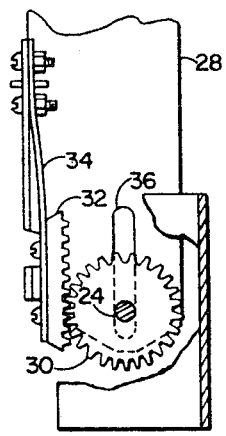
FIGURE 3 is a cross sectional representation of a portion of FIGURE 1.

Referring first to FIGURE 1 it will be noted that an upper housing member 10 is attached to a lower housing member 12. Within the housing member 10 is a support means 14 which in conjunction with housing 10 provides the support for the remainder of the mechanism. A first support means, yoke or U-shaped member 16 is supported from member 14 by a bearing 18. In FIGURE 1, the yoke 16 through holes or bearing surfaces in the legs supports at transducer means generally designated as 20 via a backing member 22 and a shaft 24. A shaft 26 only the top of which can be seen in FIGURE 1 is attached to a second yoke, support means or U-shaped member 28 the legs of which enclose transducer 20 in a manner similar to that of yoke 16. Yoke 28, however, in FIGURE 1 does not support transducer 20 but merely forces it to rotate upon rotation of the shaft 26. By reference to FIGURES 1 and 3, it will be determined that vertical movement of shaft 26 will produce movement of yoke 28 to rotate a gear 30 which is attached to shaft 24 of the transducer 20 via a rack 32 which is held in engagement with the gear 30 by a spring 34 which is mounted on the yoke 28.

Figure 2:
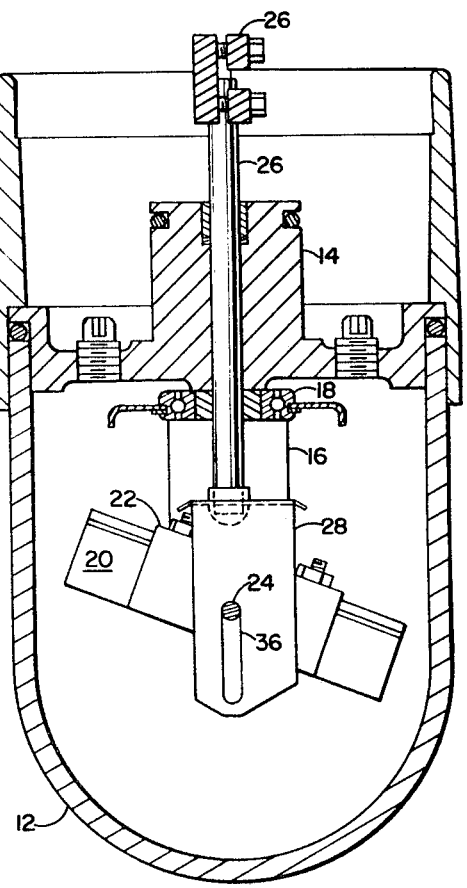
FIGURE 2 is a partial cross sectional representation of FIGURE 1.

FIGURE 2, which provides a cross sectional view through the lines 2—2 of FIGURE 1, uses the same designating numbers for the same components as in FIGURE 1.

In the normal course of operation of the unit, the shaft 26 will be in a vertical position. Thus, the rotation of the shaft about its vertical axis will rotate the transducer 20 about the vertical axis due to the interaction of the sides of a slot 36 in yoke 28 and the shaft 24 of transducer 20. Axial or vertical movement of shaft 26 will produce rotation of transducer 20 about a horizontal axis which would be perpendicular to the previously mentioned vertical axis of rotation and thus would produce a vertical or tilt sweep by the transducer in the vertical direction. This vertical sweep or rotation about a horizontal axis is produced by the previously mentioned spring loaded rack 32 which rotates gear 30 and thus transducer 20 due to vertical movement of yoke 28.

This configuration allows greater vertical sweep of the transducer 20 from slightly beyond straight down to slightly higher, approximately 20°, than horizontal. Further, only one shaft is required to produce the two types of movement at the remote end. This reduces complexity in sealing and bearing surfaces. Further, since the rack 32 is spring loaded, there are no problems due to backlash of gears which is normally overcome only by costly high tolerance dimensions or special anti-backlash gearing mechanisms.

Figure 4:
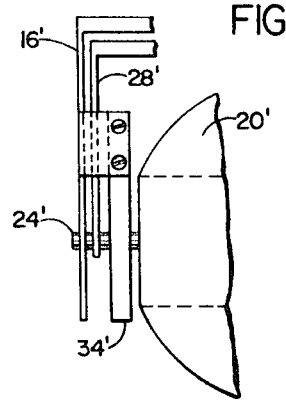
FIGURE 4 is a drawing showing a portion of FIGURE 1 to illustrate a different embodiment.

While the preferred embodiment supports the transducer 20 from the outside yoke 16, FIGURE 4 illustrates that a transducer 20' can be supported from an inside yoke 28' and the rack may be connected to an outside yoke 16' which has a slot for vertical movement of a shaft 24'. As will be realized, vertical movement of yoke 28' will move the shaft 24' in a vertical direction thus causing the gear 30' (not shown) to rotate on the rack (not shown) beneath a spring 34'. Since the rack is held stationary in a vertical position by yoke 16', the transducer 20' will move vertically at the same time that it is rotating vertically or in other words, rotating on its horizontal axis. Thus, the design will require a slightly longer space for the housing 12 but will still work satisfactorily.

The present invention has been shown and described as a remote control mechanism for a transducer, however, it will be apparent that the mechanism will be useful in other situations.

Although only two embodiments of my invention have been shown, other improvements and modifications will occur to those skilled in the art and I wish to be limited only by the scope of the appended claims wherein I claim:

1. Apparatus for positioning a transducer comprising, in combination:
   a shaft;
   a first support mounting said shaft for axial movement;
   a transducer including a gear mounted for rotation about an axis at right angles to said shaft; and
   a rack attached to said shaft and mounted for engagement with said gear, axial movement of said shaft causing rotation of said transducer.

2. Apparatus as claimed in claim 1 wherein said transducer is additionally mounted for rotation about the axis of said shaft and wherein the apparatus includes means for limiting the movement of said shaft.

3. Apparatus for positioning a transducer comprising, in combination:
- a shaft;
- a first support mounting said shaft for axial movement;
- a transducer including a gear;
- a rack; and
- means mounting said rack for spring loaded engagement with said gear for rotating said transducer about an axis at right angles to the axis of said shaft in accordance with axial movements of said shaft.

4. Apparatus as claimed in claim 3 comprising in addition means for rotating said transducer in accordance with rotation of said shaft about its own axis.

5. Apparatus as claimed in claim 4 wherein said means for rotating comprises a yoke including legs attached to said shaft and enclosing said transducer between said legs.

6. Apparatus as claimed in claim 5 comprising:
- a second support which supports said transducer from said first support and includes bearing surfaces for rotating about the axis of said shaft and has further bearing surfaces at transducer support points; and
- wherein said rack is supported from said yoke.

7. Sonar searching apparatus including a tilt-train drive mechanism comprising, in combination:
- a support;
- a transducer;
- means supporting said transducer for rotation in each of two mutually perpendicular axes;
- a shaft, including a U-shaped member at one end thereof, mounted for rotational and axial movement, legs of said U-shaped member enclosing said transducer so that rotational movement of said shaft will cause corresponding movement of said transducer; and
- a gear and a spring loaded rack for rotating said transducer in accordance with axial movement of said shaft.

8. Apparatus as claimed in claim 7 wherein said spring loaded rack is attached to said shaft and said gear is in engagement therewith and attached to said transducer and additionally comprising a protective housing attached to said support and enclosing the transducer mechanism.

References Cited
UNITED STATES PATENTS

| | | | |
|---|---|---|---|
| 2,829,360 | 4/1958 | Allyn | 340—8 |
| 2,865,014 | 12/1958 | Malm. | |
| 2,881,408 | 4/1959 | Dudley. | |

RODNEY D. BENNETT, JR., *Primary Examiner.*

BRIAN L. RIBANDO, *Assistant Examiner.*